US012103262B2

(12) United States Patent
Bellucci et al.

(10) Patent No.: US 12,103,262 B2
(45) Date of Patent: Oct. 1, 2024

(54) UNIT AND METHOD FOR APPLYING OPENING DEVICES TO A WEB OF PACKAGING MATERIAL

(71) Applicant: Tetra Laval Holdings & Finance S.A., Pully (CH)

(72) Inventors: Lauro Bellucci, Modena (IT); Fabrizio Tavernari, Nonantola (IT); Armando Stagliano, Modena (IT); Fabrizio Battistini, Argelato (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 207 days.

(21) Appl. No.: 17/765,010

(22) PCT Filed: Oct. 30, 2020

(86) PCT No.: PCT/EP2020/080577

§ 371 (c)(1),
(2) Date: Mar. 30, 2022

(87) PCT Pub. No.: WO2021/094113

PCT Pub. Date: May 20, 2021

(65) Prior Publication Data

US 2022/0355562 A1 Nov. 10, 2022

(30) Foreign Application Priority Data

Nov. 13, 2019 (EP) .................................... 19208835

(51) Int. Cl.
*B65B 41/18* (2006.01)
*B31B 50/84* (2017.01)
(Continued)

(52) U.S. Cl.
CPC .......... *B31B 50/84* (2017.08); *B65H 23/044* (2013.01); *B65H 23/1884* (2013.01)

(58) Field of Classification Search
CPC ....... B31B 50/84; B31B 50/104; B31B 50/10; B65H 23/1884; B65H 23/044; B65H 23/048
See application file for complete search history.

(56) References Cited

U.S. PATENT DOCUMENTS 4,782,987 A * 11/1988 Giacomelli ............ B65B 41/18 226/27
RE35,067 E * 10/1995 Bauknecht .............. B26D 5/00 700/122
(Continued)

FOREIGN PATENT DOCUMENTS

EP 2848399 A1 3/2015
WO 2007007379 A1 1/2007

OTHER PUBLICATIONS

International Search Report mailed Dec. 17, 2020, for priority International Patent Application No. PCT/EP2020/080577.

*Primary Examiner* — Andrew M Tecco
(74) *Attorney, Agent, or Firm* — Renner, Otto, Boisselle & Sklar, LLP

(57) ABSTRACT

A unit for applying opening devices to a web of packaging material at predetermined areas of the web arranged at a non-zero distance from one another along the web; the unit comprises a feeding group configured for feeding the web along an advancing path; at least one first tool, arranged at a first desired position along the path and configured to apply a first opening device to a corresponding first predetermined area arranged at the first desired position; and at least one second tool, arranged at a second desired position along the path and configured to apply a second opening device to a corresponding second predetermined area arranged at the second desired position; and a buffer portion arranged along the path, downstream of the second tool and upstream of the first tool, and configured to include and/or accumulate a web
(Continued)

portion having a number of predetermined areas which is an integer multiple of the number of tools of the unit.

17 Claims, 4 Drawing Sheets

(51) Int. Cl.
*B65H 23/04* (2006.01)
*B65H 23/188* (2006.01)

(56) References Cited

U.S. PATENT DOCUMENTS

| | | | | | |
|---|---|---|---|---|---|
| 5,695,106 | A * | 12/1997 | Bauknecht | B31B 70/10 226/32 |
| 6,386,851 | B1 * | 5/2002 | Gustafsson | B65B 41/18 226/32 |
| 6,508,173 | B1 * | 1/2003 | Focke | B65B 41/18 101/485 |
| 9,044,974 | B1 * | 6/2015 | Mo | B41J 13/0009 |
| 9,132,930 | B2 * | 9/2015 | Tavernari | B31B 50/85 |
| 10,286,583 | B2 * | 5/2019 | Ricco’ | B29C 45/14 |
| 2012/0272619 | A1 * | 11/2012 | Tavernari | B31B 50/85 53/64 |
| 2016/0193798 | A1 * | 7/2016 | Ricco’ | B29C 45/14 493/473 |

* cited by examiner

UNIT AND METHOD FOR APPLYING OPENING DEVICES TO A WEB OF PACKAGING MATERIAL

TECHNICAL FIELD

The present invention relates to a unit for applying opening devices to a web of packaging material.

The present invention also relates to a method for applying opening devices to a web of packaging material.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated sheet of packaging material.

In particular, the packaging material has a multilayer structure substantially comprising a base layer for stiffness and strength, which may be made of fibrous material, e.g. paper or mineral-filled polypropylene material, and a number of lamination layers made of heat-seal plastic material, e.g. polyethylene films, covering both sides of the base layer.

In the case of aseptic packages for long-storage products, such as UHT milk or fruit juice, the packaging material also comprises a layer of gas-barrier material, e.g. aluminum foil or ethyl vinyl alcohol (EVOH) film, which is superimposed on a layer of heat-seal plastic material, and is in turn covered with another layer of heat-seal plastic material. This latter layer of plastic material forms the inner face of the package eventually contacting the pourable food product.

Packages of this sort are normally produced on fully automatic packaging machines, in which a continuous tube is formed from the web-fed sheet of packaging material. Furthermore, the sheet of packaging material is sterilized in the packaging machine by applying a chemical sterilization agent, which is then removed after sterilization is completed, e.g. evaporated by heating.

Subsequently, the sheet of packaging material is maintained in a closed, sterile environment and is folded and sealed longitudinally to form the tube.

In order to complete the forming operations, the tube is filled from above, by means of a pipe, with the sterile or sterile-processed pourable food product and is formed, sealed and subsequently cut along equally spaced transversal cross sections.

Pillow packs are obtained thereby, which have a longitudinal sealing band, a top transversal sealing band and a bottom transversal sealing band, and which are then folded mechanically to form respective substantially parallelepiped-shaped finished packages.

To open the packages described above, various solutions of opening devices have been proposed.

A first solution of opening device comprises a patch defined by a small sheet of a heat-seal plastic material, and which is heat sealed over a respective hole on the side of the web eventually forming the inside of the package; and a pull-off tab applied to the opposite side of the packaging material and heat sealed to the patch. The tab and patch adhere to each other, so that, when the tab is pulled off, the portion of the patch heat sealed to the tab is also removed to uncover the hole.

A second solution of opening device comprises opening devices which are applied, at an application station, by injecting plastic material directly onto the holes of the web. In this case, the application station is a molding station.

Finally, a third solution of opening device comprises a frame defining an opening and molded at a pierceable or removable portion of the packaging material.

The pierceable portion of the package may be defined by a so-called "pre-laminated" hole, i.e. a hole formed in the packaging material in the base layer only and covered by the other lamination layers, including the layer of gas-barrier material. Also in this case, the application station is a molding station.

More precisely, the web is provided with a plurality of pre-laminated holes and then fed to the packaging machine.

Regardless of the type of opening devices to be applied onto the web, the web is wound off from a reel within the packaging machine. Subsequently, the web is stepwise fed to the application station before the packaging material is folded to form a tube. In particular, the web is fed towards the application station along an advancing path (or advancing direction).

The application of opening devices on the web requires that the holes or pre-laminated holes are arrested in respective desired positions relative to the application station, for a correct application of each opening device at the predetermined desired position on the web.

EP-A-2357138, in the name of the same Applicant, discloses a unit for applying opening devices onto respective pre-laminated holes, substantially comprising:

- a molding station, which is stepwise fed with the web and is adapted to injection mold a plurality of opening devices onto the web and in correspondence of respective pre-laminated holes of the web; and
- an advancing device, which is arranged downstream of the molding station according to the advancing direction of the web along the advancing path and adapted to advance the web along the advancing path.

In particular, the advancing device stepwise feeds one after the other and along the advancing path a plurality of portions of the web each comprising three pre-laminated holes towards the molding station.

The molding station comprises a plurality of molds, three according to this solution, arranged adjacent to one another along the advancing path and injecting the plastic material forming the opening devices onto the web and in correspondence of respective pre-laminated holes.

Each pre-laminated hole is associated with a respective reference element, in particular a position marker configured to be associated with the position of the respective pre-laminated hole along the advancing path. In the known solution, the position markers are magnetic markers.

In order to adjust the position of the pre-laminated holes with respect to relative molds, the unit comprises a sensor, in particular a magnetic sensor, for detecting the presence of markers while the web is advancing and generating respective measure signals associated to the real positions of the pre-laminated holes.

Preferably, an adjustment displacement of the web along the advancing path is associated to the difference between the detected position and the desired position of only one, namely the intermediate one, pre-laminated hole.

In practice, by means of the detection of the real position of the intermediate pre-laminated hole relative to its desired position, the known solution allows to correctly position the other two pre-laminated holes in the desired positions along the advancing path.

However, by using only one reference pre-laminated hole with respect to relative mold, in particular the intermediate pre-laminated hole, the remaining pre-laminated holes will not be precisely and nominally arranged in the respective desired positions with respect to relative molds. This is because, there are inevitable tolerance errors in the distance between homologous points, e.g. the axes, of the remaining pre-laminated holes and of the reference pre-laminated hole.

The higher the number of the molds in the molding station, or of tools in the application station, the higher the propagation of the tolerance error to the remaining holes or pre-laminated holes, i.e. the longer the tolerance chain formed by the inevitable errors in the distances between homologous points, e.g. between the axes, of the reference pre-laminated hole (or hole) and the remaining pre-laminated holes (or holes).

EP-A-2848399, in the name of the same Applicant, shows a unit for applying opening devices onto respective pre-laminated holes comprising two molding stations, each one having three molds.

In order to avoid the propagation of the tolerance error between the two molding stations, the unit of EP-A-2848399 describes an independent centering of the two intermediate pre-laminated holes to be injected by the two molding stations, respectively.

For the downstream molding station, relative to the advancing direction, the centering of the relative intermediate pre-laminated hole is made on the basis of a signal of a position sensor.

For the upstream molding station, the centering of the relative intermediate pre-laminated hole is made by means of a roller actuator arranged between the two molding stations, relative to the advancing path, and controllable for sequentially recovering an intentionally imparted offset between such intermediate pre-laminated hole and the nominal position at which the intermediate pre-laminated hole should receive the opening device injected thereonto.

It is known in the field the need for further reducing the size of the packages, e.g. for producing single serving portion packages. This entails the reduction of the nominal distance between consecutive holes or pre-laminated holes of the web of packaging material, in order to produce smaller packages.

However, in the units comprising two or more molding station, like the one described in EP-A-2848399, the relative distance between the two molding stations cannot be reduced indefinitely, since such distance has to be enough to contain the roller actuator.

A need is therefore felt within the industry to minimize in the most efficient way the propagation of the tolerance error in case a plurality of molding stations are present and, at the same time, to minimize in the most efficient way the propagation of the tolerance error in case it is necessary to reduce the distance between consecutive holes or pre-laminated holes for producing smaller packages.

DISCLOSURE OF INVENTION

It is therefore an object of the present invention to provide a unit for applying opening devices to a web of packaging material, which is designed to meet the above-mentioned needs in a straightforward and low-cost manner.

This object is achieved by a unit for applying opening devices as claimed in claim 1.

It is a further object of the present invention to provide a method for applying opening devices to a web of packaging material, which is designed to meet the above-mentioned needs in a straightforward and low-cost manner.

This object is achieved by a method for applying opening devices as claimed in claim 11.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
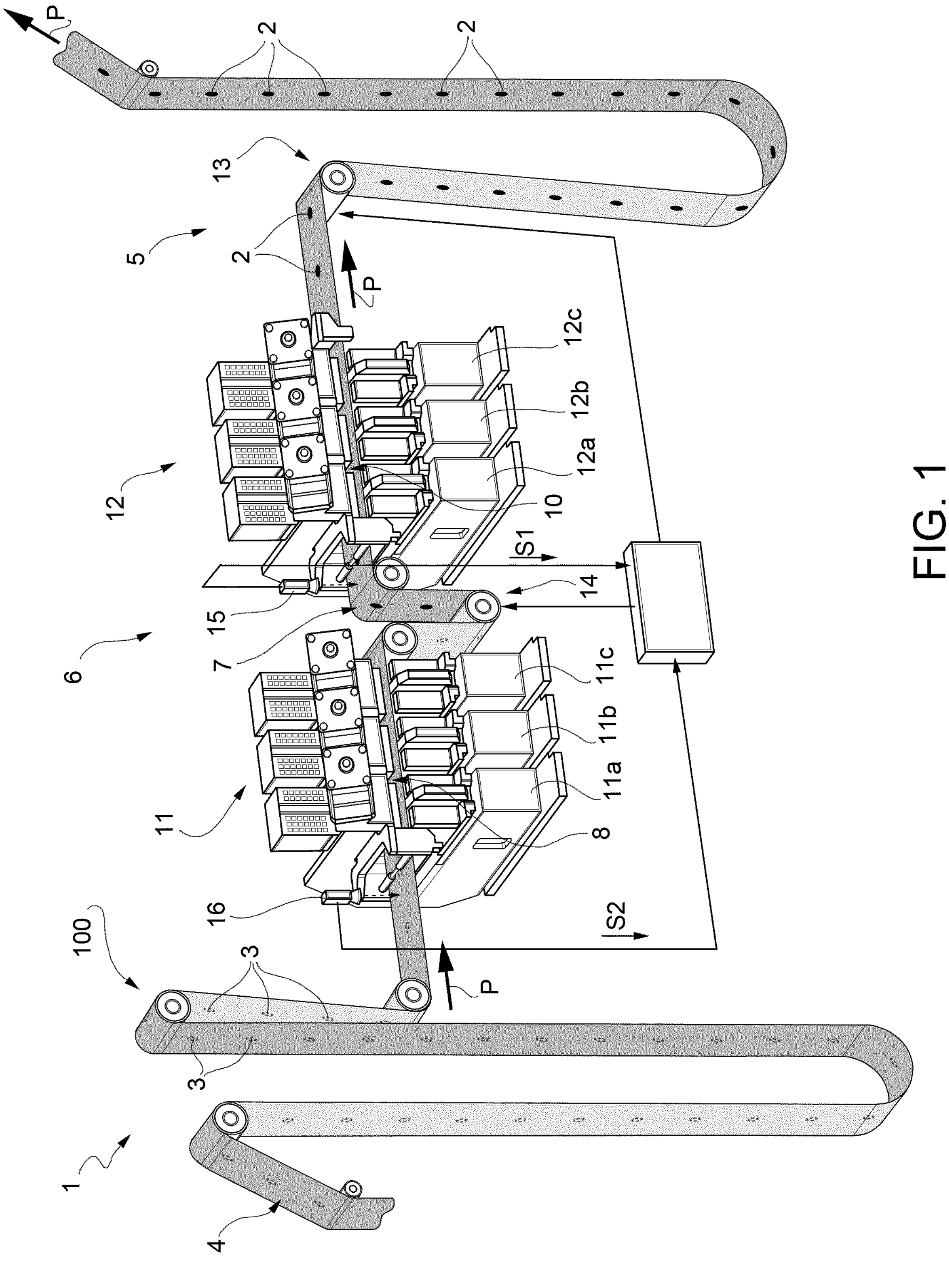
FIG. 1 is a perspective view, with parts removed for clarity, of a unit for applying opening devices to a web of packaging material according to the present invention.

With reference to FIG. 1, number 1 indicates as a whole a unit for applying a plurality of opening devices (only schematically shown) onto respective predetermined areas of a web 4 of packaging material, in particular a web 4 in the form of a strip initially wound about a respective reel (not shown) arranged upstream of unit 1.

The packaging material is intended to form a plurality of packages (not shown) adapted to contain a pourable product, preferably a pourable food product.

The packaging material has a multilayer structure (not shown) and comprises a layer of fibrous material, e.g. paper, covered on both sides with respective lamination layers of heat-seal plastic material, e.g. polyethylene.

In the case of aseptic packages for long-storage products, such as UHT milk, the packaging material also comprises a layer of gas-and-light barrier material, e.g. aluminum foil or ethylene vinyl alcohol (EVOH) film, which is superimposed on a layer of heat-seal plastic material, and is in turn covered with another layer of heat-seal plastic material, the latter forming the inner face of the package eventually contacting the pourable product.

Packages are formed starting from a tube (not shown) of packaging material. The tube is formed in known manner downstream of unit 1 by longitudinally folding and sealing web 4.

The tube of packaging material is then filled with the food product, and is sealed and cut along equally spaced cross sections to form a number of pillow packs (not shown), which are then transferred to a folding unit where they are folded mechanically to form respective packages.

According to this preferred and non-limiting embodiment shown, the predetermined areas of web 4 are defined by removable portions of web 4.

More precisely, such removable portions are defined by so-called pre-laminated holes 3, i.e. holes (or openings) formed through the base layer only and covered by the other lamination layers of the packaging material, so that each hole is sealed by a respective sheet cover portion (known per se and neither shown nor described in detail).

In particular, pre-laminated holes 3 are arranged along web 4, i.e. in a lengthwise direction of web 4, in respective positions equally spaced from one another, except for the inevitable tolerance errors.

Accordingly, unit 1 is a molding unit for molding, in particular for injection molding, a plurality of opening devices 2 onto respective pre-laminated holes 3.

Figure 2:
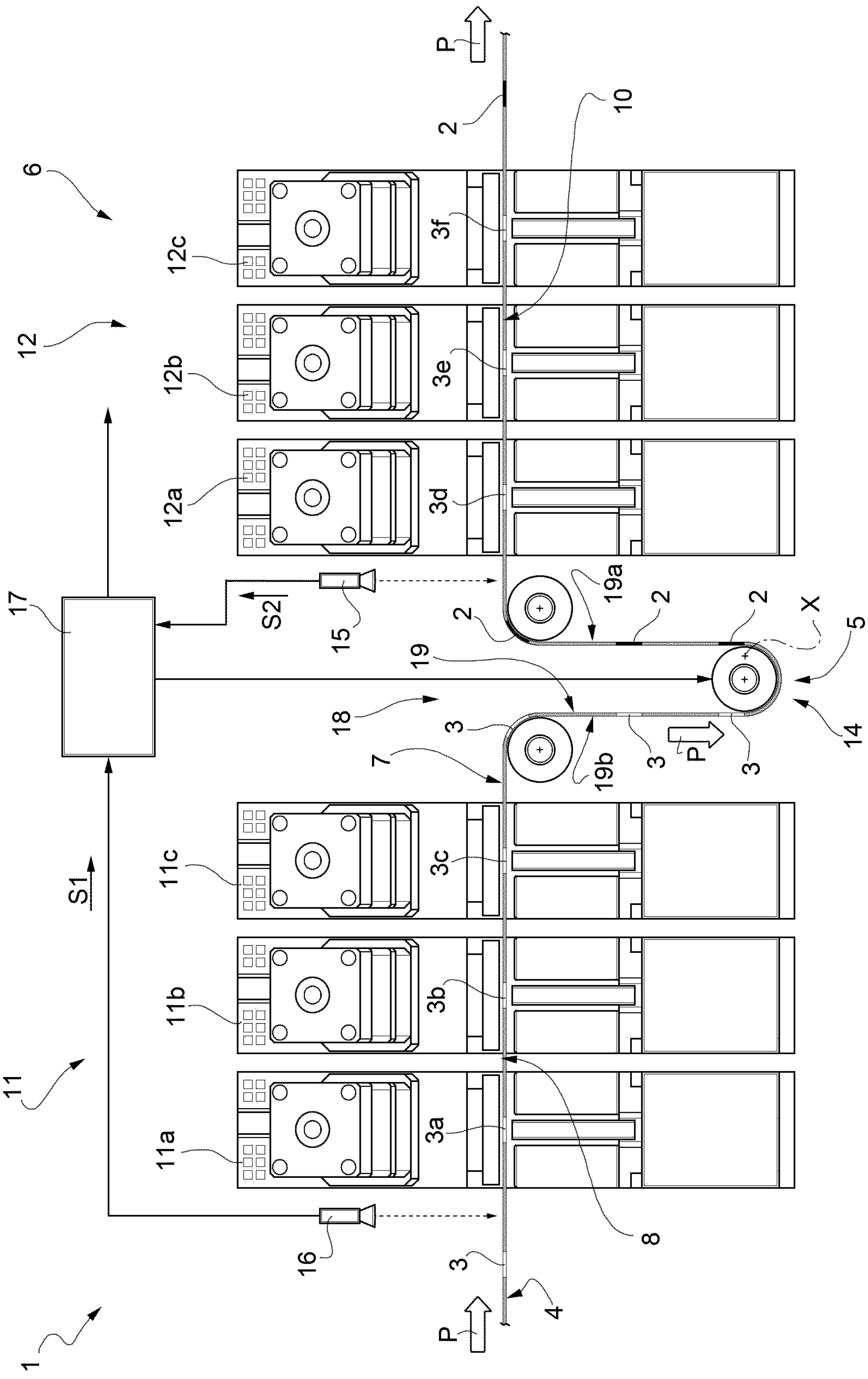
FIG. 2 is a larger-scale side view, with parts removed for clarity of the unit of FIG. 1.

As visible in FIGS. 1 and 2, unit 1 substantially comprises:

- a feeding group 5 arranged downstream of the storage reel and configured to feed (i.e. to advance) web 4 to unit 1 along an advancing path P; and
- an application station, in particular a molding station 6 fed, in use, with web 4 advanced by feeding group 5 and configured to injection mold opening devices 2 onto web 4 at respective pre-laminated holes 3.

In detail, feeding group 5 stepwise feeds, in use and one after the other, a plurality of portions 7 of web 4, each comprising a predetermined number of pre-laminated holes 3, in a manner that will be described in the following.

In greater detail, each portion 7 includes, relative to path P, at least:

- a stretch 8 comprising a first group, three in the embodiment shown, of pre-laminated holes 3*a*, 3*b*, 3*c*; and
- a stretch 10 comprising a second group, three in the embodiment shown, of pre-laminated holes 3*d*, 3*e*, 3*f*.

It is stated that the wording "relative to path P" and "along path P" is intended to indicate, in the present description and in the claims, the direction of advancement of web 4 through unit 1, in the sense indicated by the arrows in FIGS. 1 to 3*b*.

Therefore, cyclically, pre-laminated holes 3*a*, 3*b*, 3*c* of each portion 7 (i.e. of each stretch 8) are upstream of pre-laminated holes 3*d*, 3*e*, 3*f* of the same portion 7 (i.e. of relative stretch 10), along path P.

Furthermore, pre-laminated hole 3*b* is arranged centrally with respect to, and at the same distance from, pre-laminated holes 3*a* and 3*c*; similarly, pre-laminated hole 3*e* is arranged centrally with respect to, and at the same distance from, pre-laminated holes 3*d* and 3*f*.

For the sake of brevity, reference is made in the following to a single portion 7 of web 4 onto which opening devices 2 have to be applied, in particular molded, by means of molding station 6. However, the structural and functional features disclosed hereinafter for such portion 7 are equally applicable to all portions 7 of web 4 to be treated by unit 1.

In order to injection mold opening devices 2 onto pre-laminated holes 3 of portion 7, molding station 6 comprises:

- a first group 11 of molds, three molds 11*a*, 11*b*, 11*c* in the embodiment shown, configured to inject plastic material onto pre-laminated holes 3*a*, 3*b*, 3*c*, respectively, so as to form respective opening devices 2 onto web 4; and
- a second group 12 of molds, three molds 12*a*, 12*b*, 12*c* in the embodiment shown, configured to inject plastic material onto pre-laminated holes 3*d*, 3*e*, 3*f*, respectively, so as to form respective opening devices 2 onto web 4.

In detail, molds 11*a*, 11*b*, 11*c*, 12*a*, 12*b*, 12*c* are arranged at respective desired positions along path P. In greater detail, molds 11*a*, 11*b*, 11*c*, 12*a*, 12*b*, 12*c* are fixed at such respective desired positions thereby defining respective axes A, B, C, D, E, F fixed along path P, such axes being transversal, in particular orthogonal to path P.

More precisely, axes A, B, C are orthogonal to stretch 8, and axes D, E, F are orthogonal to stretch 10, when portion 7 is treated, in use, by molding station 6.

In one embodiment, first group 11 of molds could comprise only one of molds 11*a*, 11*b* or 11*c* and second group 12 of molds could comprise only one of molds 12*a*, 12*b* or 12*c*.

In light of the above, each mold 11*a*, 11*b*, 11*c*, 12*a*, 12*b*, 12*c* is configured to injection mold a respective opening device 2 onto a respective pre-laminated hole 3*a*, 3*b*, 3*c*, 3*d*, 3*e*, 3*f* of portion 7, in correspondence of axes A, B, C, D, E, F, respectively.

Furthermore, each pre-laminated hole 3*a*, 3*b*, 3*c*, 3*d*, 3*e*, 3*f* is associated to a respective axis G, H, I, L, M, N movable along path P and at which the respective opening device 2 should be injected, according to nominal operation of unit 1.

Therefore, the distance between axes A, B; B, C; D, E; E, F measured parallel to path P equals the predetermined nominal distance between axes G, H; H, I; L, M; M, N at which the pre-laminated holes 3 are nominally arranged onto web 4.

Hence, for each pre-laminated hole 3*a*, 3*b*, 3*c*, 3*d*, 3*e*, 3*f* it is possible to identify a respective desired injection position at which movable axes G, H, I, L, M, N coincide with corresponding fixed axes A, B, C, D, E, F, respectively.

For this purpose, portion 7 of web 4 has to be positioned, by means of feeding group 5, in a way that each one of the axes G, H, I, L, M, N coincide with the corresponding one of the axes A, B, C, D, E, F, respectively.

However, it is important to point out that due to the inevitable tolerance errors existing in the distance, measured parallel to path P, between each pre-laminated hole 3, and therefore also between consecutive axes G, H, I, L, M, N, it is not possible to simultaneously position all pre-laminated holes 3*a*, 3*b*, 3*c*, 3*d*, 3*e*, 3*f* in the relative desired injection positions, at which axes G, H, I, L, M, N coincide with axes A, B, C, D, E, F, respectively.

For this purpose, feeding group 5 comprises:

- an advancing device 13 configured to feed portion 7 to molding station 6 and to advance, in particular to position, stretch 10 along path P in a way such that at least pre-laminated hole 3*e*, that is the "central" one among the pre-laminated holes 3*d*, 3*e*, 3*f*, is at the respective desired position, i.e. in a way such that axis M coincides with axis E;
- an adjusting device 14, configured to move, in particular to position, stretch 8 along path P in a way such that at least pre-laminated hole 3*b*, that is the "central" one among the pre-laminated holes 3*a*, 3*b*, 3*c*, is at the respective desired position, i.e. in a way such that axis B coincides with axis H.

Conveniently, in the example shown, advancing device controls the positioning of the "central" pre-laminated hole 3*e* to minimize the tolerance error relative to the adjacent pre-laminated holes 3*d* and 3*f*, thereby avoiding the chaining of such tolerance error. Similarly, adjusting device 14 controls the positioning of the "central" pre-laminated hole 3*b* to minimize the tolerance error relative to the adjacent pre-laminated holes 3*a* and 3*c*, thereby avoiding the chaining of such tolerance error.

In another alternative embodiment not shown, advancing device 13 could control the positioning of any one of the pre-laminated holes 3*d*, 3*e*, 3*f* of portion 7 and adjusting device 14 could control the positioning of any one of the pre-laminated holes 3*a*, 3*b*, 3*c* of portion 7.

According to this embodiment, advancing device 13 is defined by a roller arranged downstream of second group 12 of molds along path P, drivable by a relative non-shown actuator, e.g. a stepper motor, supporting, in use, web 4 and cooperating in contact with web 4 to stepwise advance web 4 along path P.

In greater detail, advancing device 13 is configured to pull web 4 from the relative storage reel by applying a pulling tension to web 4, thereby determining the advancement of web 4 along path P.

As visible in FIGS. 1, 2, 3*a* and 3*b*, unit 1 further comprises:

a first position sensor 15 arranged upstream of second group 12 of molds, in particular at least upstream of mold 12*b*, configured to detect the position of pre-laminated hole 3*e* and to generate a signal S1 correlated with the position detected;

a second position sensor 16 arranged upstream of first group 11 of molds, in particular at least upstream of mold 11*b*, configured to detect the position of pre-laminated hole 3*b* and to generate a signal S2 correlated with the position detected; and a control unit 17 configured to receive signal S1 and signal S2, to compare signal S1 with a signal S3 correlated to a pre-set nominal position of pre-laminated hole 3*e* along path P, to compare signal S2 with a signal S4 correlated to a pre-set nominal position of pre-laminated hole 3*b* along path P, and to calculate a first position difference value E1, based on the comparison between signals S1 and S3, and a second position difference value E2, based on the comparison between signals S2 and S4.

In the example shown, web 4 comprises a plurality of magnetic markers (known per se and not shown), each associated with a respective pre-laminated hole 3, in particular with the position of such respective pre-laminated hole 3.

Accordingly, first sensor 15 and second sensor 16 are configured to be magnetically coupled with, i.e. to “sense”, the magnetic markers in order to detect the positions of pre-laminated holes 3.

Alternatively, first sensor 15 and second sensor 16 could be optical sensors, configured to optically detect the positions of pre-laminated holes 3.

In light of the above, in order to ensure the proper positioning of pre-laminated hole 3*e* and pre-laminated hole 3*b* within molding station 6:

advancing device 13 is configured to advance pre-laminated hole 3*e* towards and at the relative desired position, at which axis M coincides with axis E, on the basis of calculated value E1; and adjusting device 14 is configured to position pre-laminated hole 3*b* at the relative desired position, at which axis H coincides with axis B, on the basis of calculated value E2.

Feeding group 5 further comprises a tensioning device 100 arranged upstream of first group 11 of molds and configured to put and maintain under tension the web 4 by exerting a pulling action on web 4 in a direction opposite to the advancing direction of web 4 along path P.

In practice, advancing device 13 advances, in use, web 4 along path P by overcoming the tensioning force of tensioning device 100.

Accordingly, if pre-laminated hole 3*b* is in a non-nominal position for which axis H is downstream of axis B with respect to the advancing direction of web 4 along path P, then adjusting device 14 releases web 4 on the basis of calculated value E2 and, at the same time, tensioning device 100 pulls back web 4, according to a manner described in the following. In this way a dynamic and adaptive positioning of pre-laminated holes 3*b* and 3*e*, and therefore also of pre-laminated holes 3*a*, 3*c*, 3*d*, 3*f* can be obtained, remaining within the acceptable tolerance errors.

It is hereby stated that values E1 and E2 are conveniently calculated as absolute values of the differences of the positions correlated with signals S1, S3 and S2, S4, respectively.

As shown in EP-A-2848399, it is known in the field to provide a distance between the first group of molds and the second group of molds different from the distance between two adjacent molds of the same group of molds. In particular, the above-mentioned distance is smaller than the nominal distance between two consecutive pre-laminated holes, measured along the advancing path. Such a configuration is necessary since the roller actuator, which is interposed between the two groups of molds (the two molding stations), has to recover an intentionally imparted offset between the intermediate pre-laminated hole and the nominal position at which the intermediate pre-laminated hole should receive the opening device injected thereonto.

However, in the case it is necessary to further reduce the above-mentioned distance between the first group of molds and the second group of molds e.g. for producing smaller packages, the problem of the intrinsic volume and space occupied by the roller actuator measured along path P arises In fact, the distance between the first group of molds and the second group of molds cannot be reduced in an unlimited manner, due to the space occupied by the roller actuator interposed between the two groups of molds.

To this end, with reference to the present invention, unit 1 comprises a buffer portion 18 arranged along path P, downstream of first group 11 of molds and upstream of second group 12 of molds, in particular downstream of mold 11*c* and upstream of mold 12*a*, and configured to include and/or accumulate a web portion 19 having a number of pre-laminated holes 3 which is an integer multiple of the number of molds 11*a*, 11*b*, 11*c*, 12*a*, 12*b*, 12*c* of molding station 6.

In practice buffer portion 18 is an accumulation portion defining an accumulation path within path P, where, cyclically and one after the other, web portions 19 of web 4 are accumulated, i.e. included at any given cycle, before being fed to second group 12 of molds.

In other words, portion 7 comprises a third stretch arranged downstream of stretch 8 and upstream of stretch 10 and defined by web portion 19.

Furthermore, as stated above, web portion 19 comprises a number of pre-laminated holes 3 which is, conveniently, an integer multiple of the number of molds of the molding station 6.

Hence, according to this embodiment, web portion 19 has preferably six pre-laminated holes 3.

In alternative embodiments not shown, web portion 19 has preferably twelve, eighteen, etc. pre-laminated holes 3.

In practice, since molding station 6 according to this embodiment has six molds 11*a*, 11*b*, 11*c*, 12*a*, 12*b*, 12*c*, buffer portion 18 includes and/or accumulates, in use, a number N of pre-laminated holes 3 according to the equation $$N=6*m$$

where m is a natural integer number, i.e. m=1, 2, 3, 4, 5, 6 . . . .

Accordingly, if molding station 6 had k molds, N would be equal to $$N=k*m.$$

Conveniently, adjusting device 14 is arranged at buffer portion 18.

In particular, adjusting device 14 is arranged in a position so that a first stretch 19*a* of web portion 19 is located downstream of adjusting device 14 and a second stretch 19*b* of web portion 19 is located upstream of adjusting device 14, relative to path P.

In light of the above, second stretch 19*b* is adjacent and connected to stretch 8, and therefore is adjacent to pre-laminated holes 3*a*, 3*b*, 3*c*, while first stretch 19*a* is adjacent and connected to stretch 10, and therefore is adjacent to pre-laminated holes 3*d*, 3*e*, 3*f*.

Preferably, first stretch 19*a* defines a first half of web portion 19 and second stretch 19*b* defines a second half of web portion 19. In this case, both first stretch 19*a* and second stretch 19*b* include three pre-laminated holes 3, since web portion 19 has six pre-laminated holes 3.

Adjusting device 14 is configured to control a movement of second stretch 19*b* along path P to position pre-laminated hole 3*b* at the relative desired position on the basis of value E2, while leaving first stretch 19*a* substantially stationary, in particular stationary, along path P.

In addition, advancing device 13 is configured to position first stretch 19*a* at least while adjusting device 1 controls the movement of second stretch 19*b* along path P, therefore substantially avoiding, in particular avoiding, a movement of the already-positioned first stretch 19*a*.

Furthermore, tensioning device 100 maintains under tension web 4 by pulling second stretch 19*b* in a direction opposite to the advancing direction of web 4 along path P.

The above configuration allows to position both pre-laminated hole 3*e* and pre-laminated hole 3*b* at the respective desired positions, thereby minimizing any eventual tolerance error between pre-laminated hole 3*e* and pre-laminated holes 3*d* and 3*f*; and between pre-laminated hole 3*b* and pre-laminated holes 3*a* and 3*c*. At the same time, the distance between first group 11 of molds and second group 12 of molds, in particular between molds 11*c* and 12*a* is not anymore linked to the nominal distance between consecutive pre-laminated holes 3, thanks to the presence of buffer portion 18. In fact, second group 12 of molds can be positioned at any convenient desired distance from first group 11 of molds. Accordingly, the distance between pre-laminated holes 3 can be further reduced.

Therefore, unit 1 can be used to produce smaller packages, since the distance between each pre-laminated hole 3 of web 4 is reduced.

Figure 3A:
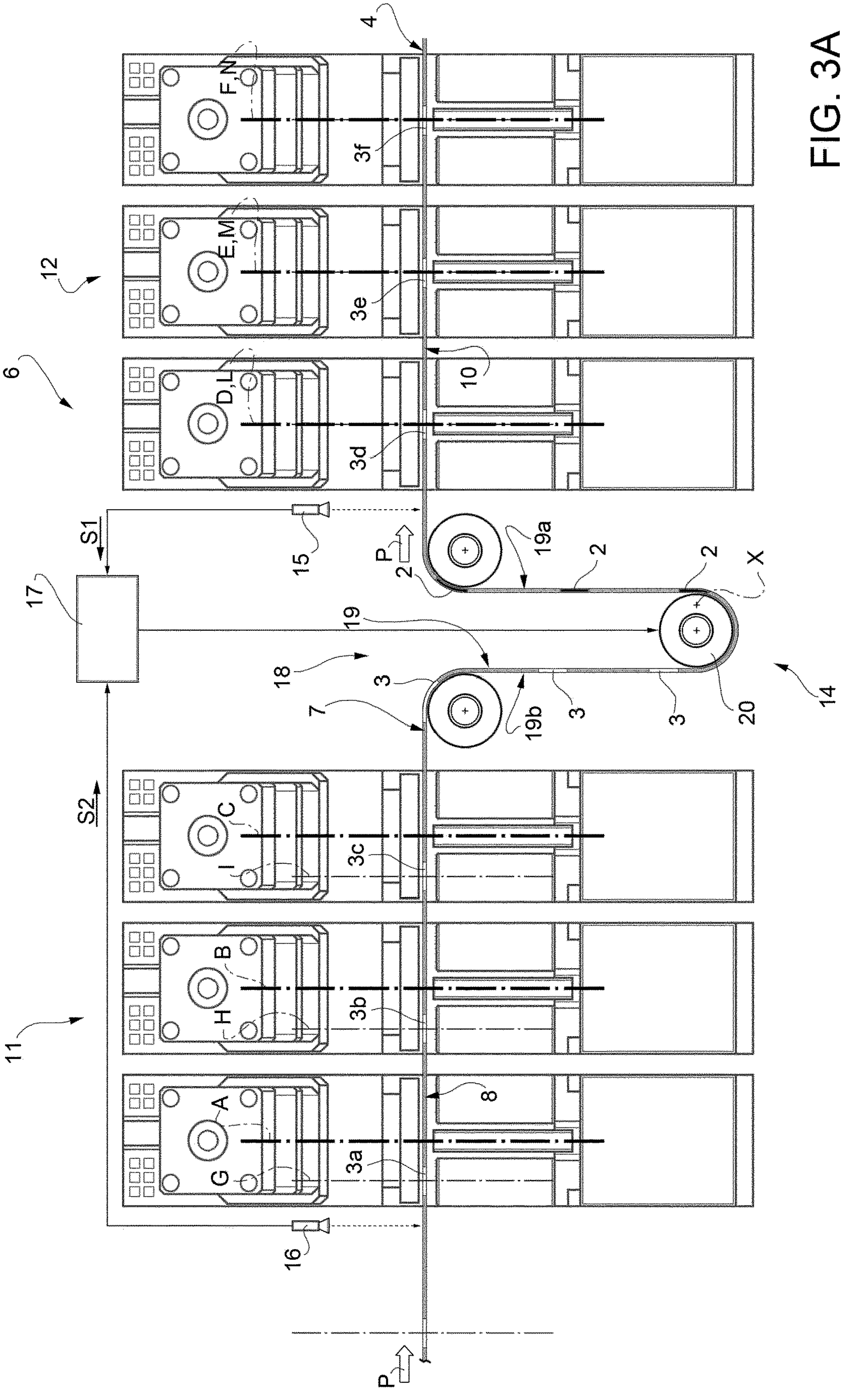
FIGS. 3*a* and 3*b* are larger-scale, schematic side views, with parts removed for clarity, of a detail of the unit of FIG. 1 during two different operating conditions.
Figure 3B:
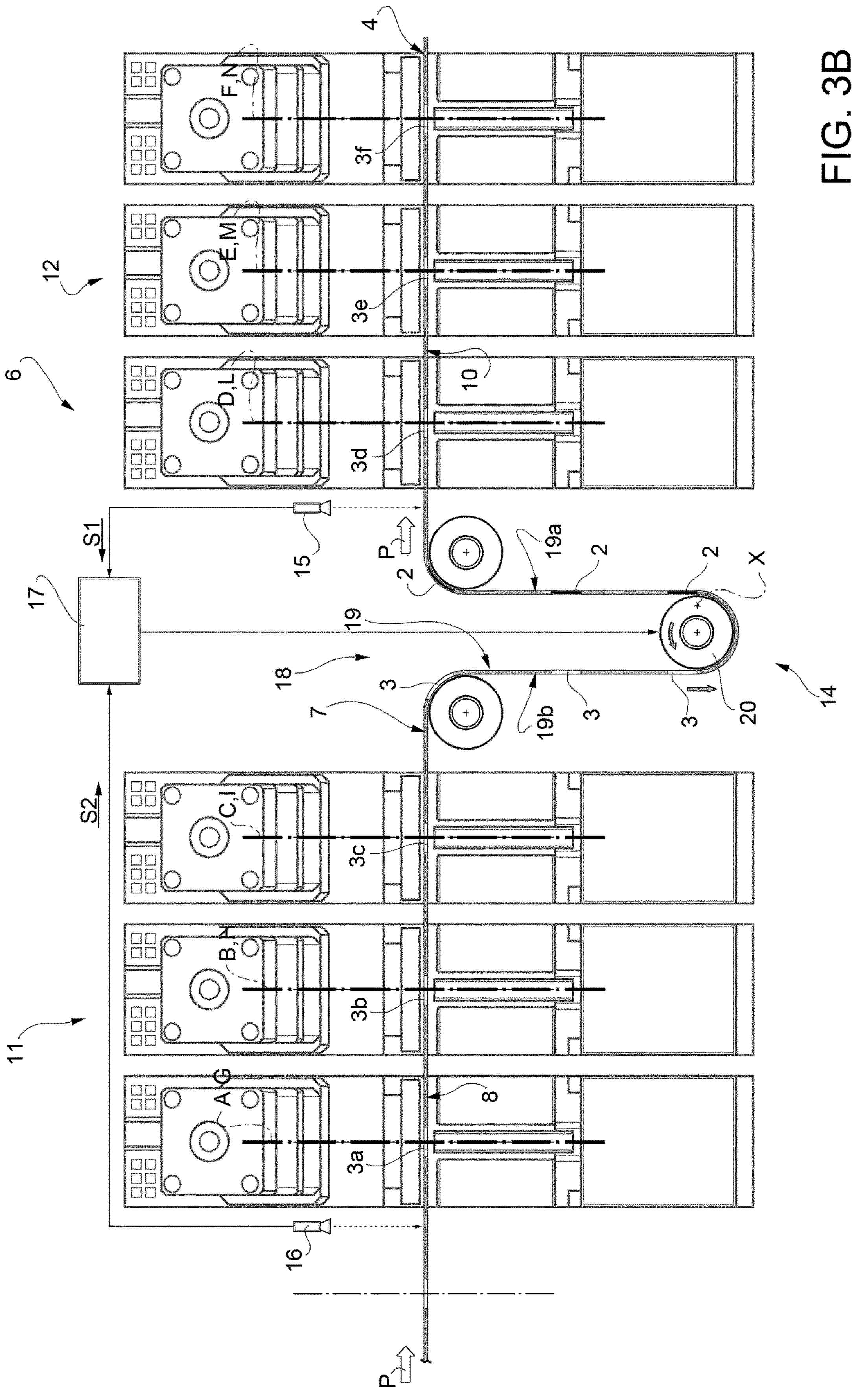

Preferably, molds 11*a*, 11*b*, 11*c* are configured to apply opening devices 2 to the three pre-laminated holes 3 of first stretch 19*a*, whereas molds 12*a*, 12*b*, 12*c* are configured to apply opening devices 2 to the three pre-laminated holes 3 of second stretch 19*b*, as shown in FIGS. 3*a* and 3*b*.

In practice, during a first step opening devices 2 are molded onto first stretch 19*a* and during a subsequent step, opening devices 2 are molded onto second stretch 19*b*, for each portion 7 of web 4.

According to this non-limiting preferred embodiment shown, adjusting device 14 comprises a rotatable member 20 which supports, in use, web 4 and which is rotatable eccentrically about a fixed longitudinal axis X transversal, in particular orthogonal, to path P, on the basis of value E2, to push or release web portion 19 to position pre-laminated hole 3*b* at the relative desired position (i.e. so that axis H coincides with axis B).

More precisely, adjusting device 14 comprises a known actuator, for example a stepper motor (not shown) configured to be controlled by control unit 17 on the basis of value E2, in order to rotate a shaft (not shown) about axis X.

Rotatable member 20 is coupled eccentrically to the above-mentioned shaft (in a manner known and not shown in detail), and therefore is eccentrically arranged relative to axis X, so that a rotation of such shaft about axis X drives a translation movement of rotatable member 20 towards or away from web portion 19.

In this way, rotatable member 20 drags or releases, in use, second stretch 19*b* along path P. The dragging or releasing of second stretch 19*b*, combined with the tensioning imparted by tensioning device 100, determines the adjustment of the position of pre-laminated hole 3*b* along path P, on the basis of value E2 (FIGS. 3*a* and 3*b*).

The above dragging or releasing also determines the positioning of axes G and I of pre-laminated holes 3*a* and 3*c* with respect to axes A and C of molds 11*a* and 11*c*, within the acceptable tolerance errors.

The operation of unit 1 is described hereinafter with reference to FIGS. 3*a* and 3*b* and starting from a condition in which advancing device 13 has already nominally positioned pre-laminated hole 3*e* so that axis M coincides with axis E, on the basis of the calculated value E1. In addition, first group 11 of molds has already injected three opening devices 2 on three corresponding pre-laminated holes 3 of first stretch 19*a* of the web portion 19 accumulated in buffer portion 18.

In such condition, control unit 17 calculates value E2. If such value E2 is different from zero (as shown in FIG. 3*a*), control unit 17 drives adjusting device 14, in particular rotatable member 20, to act on second stretch 19*b* and move second stretch 19*b* along path P, while leaving first stretch 19*a* substantially stationary, preferably stationary, along path P. The amplitude of the movement will depend on the calculated value E2. At the same time, tensioning device 100 maintains under tension web 4 and in particular second stretch 19*b*. If needed, tensioning device 100 also pulls back second stretch 19*b* in a direction opposite the advancing direction along path P. Also, the amplitude of this movement will depend on the position of advancing device 14 (rotatable member 20), i.e. on the calculated value E2.

In this way, pre-laminated hole 3*b* can be positioned at the relative desired injection position under mold 12*b*, i.e. axis H coincides with axis B (as shown in FIG. 3*b*).

In this condition, first group 11 of molds injects opening devices 2 onto pre-laminated holes 3*a*, 3*b*, 3*c* (within the acceptable tolerance errors) and second group 12 of molds injects opening devices 2 onto pre-laminated holes 3*d*, 3*e*, 3*f* (within the acceptable tolerance errors).

The pre-laminated holes 3 of the second stretch 19*b* of web portion 19 will be injected with plastic material by the second group 12 of molds during the next cycle, i.e. injection cycle.

It is stated that if value E2 is equal to zero, no actuation of adjusting device 14 occurs, i.e. no movement of rotatable member 20 is driven.

The advantages of unit 1 according to the present invention will be clear from the foregoing description. In particular, unit 1 according to the present invention ensures that the tolerance errors are not propagated and thereby minimized along path P, while, at the same time allowing a reduction of the distance between pre-laminated holes 3 of web 4, since the distance between first group 11 of molds and second group 12 of molds, in particular between molds 11*c* and 12*a* is not anymore linked to the distance between pre-laminated holes 3, thanks to the presence of buffer portion 18.

Clearly, changes may be made to unit 1 as described herein without, however, departing from the scope of protection as defined in the accompanying claims.

In particular, opening devices 2 could be of different type and, accordingly, the application station could entail a different kind of application than molding.

For example, in one embodiment opening devices 2 could comprise a patch defined by a small sheet of heat-seal plastic material, which is heat sealed over a respective hole on the side of web 4 eventually forming the inner side of the packages; and a pull-off tab applied to the opposite side of the packaging material and heat sealed to the patch. In this solution, the patch and the tab adhere to one another, so that, when the tab is pulled off, the portion of the patch heat sealed to it is also removed to uncover the hole (and open the package).

The invention claimed is:

1. A unit for applying opening devices to a web of packaging material at predetermined areas of said web arranged at a non-zero distance from one another along said web;

wherein the web fed to the unit is provided with a plurality of pre-laminated holes, said unit comprising:

a feeding group configured for feeding said web along an advancing path;

at least one first tool, arranged at a first fixed desired position along said path thereby defining a respective first axis fixed along said path, and configured to apply a first opening device to a corresponding first predetermined area arranged at said first desired position;

wherein said first tool is a first molding station for molding said first opening device onto said corresponding first predetermined area arranged at said first desired position; and at least one second tool, arranged at a second fixed desired position along said path thereby defining a respective second axis fixed along said path, and configured to apply a second opening device to a corresponding second predetermined area arranged at said second desired position wherein the second tool is a second molding station for molding said second opening device onto said corresponding second predetermined area arranged at said second desired position;

a buffer portion arranged along said path, downstream of said second tool and upstream of said first tool, and configured to include and/or accumulate a web portion having a number of said predetermined areas which is an integer multiple of the number of tools of said unit;

a first position sensor, arranged upstream of said first tool along said path, configured to detect the position of said first predetermined area and to generate a first information correlated to the detected position of said first predetermined area;

a second position sensor, arranged upstream of said second tool along said path, configured to detect the position of said second predetermined area and to generate a second information correlated to the detected position of said second predetermined area; and a control unit configured to receive said first information and said second information, to compare said first information with a third information correlated to a pre-set nominal position of said first predetermined area along said path, to compare said second information with a fourth information correlated to a pre-set nominal position of said second predetermined area along said path, and to calculate a first position difference value, based on the comparison between said first information and said third information, and a second position difference value, based on the comparison between said second information and said fourth information;

said feeding group comprising:

an advancing device configured to advance said first predetermined area towards and at said first desired position, on the basis of said first position difference value, and to feed said web portion to said buffer portion, wherein the advancing device is configured to advance a first pre-laminated hole towards and at a respective desired position, at which an axis of the first pre-laminated hole coincides with the first axis, on the basis of the calculated first position difference value; and an adjusting device configured to position said second predetermined area at said second desired position, on the basis of said second position difference value, wherein the adjusting device is configured to position a second pre-laminated hole at a respective desired position, at which an axis of the second pre-laminated hole coincides with the second axis, on the basis of the calculated second position difference value.

2. The unit as claimed in claim 1, wherein said adjusting device is arranged at said buffer portion in a position so that a first stretch of the web portion in the buffer portion is located downstream of the adjusting device and a second stretch of the web portion in the buffer portion is located upstream of the adjusting device, relative to said path;

said adjusting device being configured to control a movement of the second stretch along said path to position said second predetermined area at said second desired position, on the basis of said second position difference value, while leaving the first stretch substantially stationary along said path;

said unit further comprising a tensioning device arranged upstream of said second tool and configured to put and maintain under tension said web and to pull said web in a direction opposite to the advancing direction of the web along said advancing path.

3. The unit as claimed in claim 2, wherein said first stretch defines a first half of said web portion and wherein said second stretch defines a second half of said web portion.

4. The unit as claimed in claim 2, wherein said advancing device is configured to position said first stretch at least while said adjusting device controls the movement of said second stretch along said path.

5. The unit as claimed in claim 2, wherein, cyclically, said first tool is configured to apply opening devices to the predetermined areas of said second stretch and said second tool is configured to apply opening devices to the predetermined areas of said first stretch; or wherein, cyclically, said first tool is configured to apply opening devices to the predetermined areas of said first stretch and said second tool is configured to apply opening devices to the predetermined areas of said second stretch.

6. The unit as claimed in claim 1, wherein said adjusting device comprises a moving member movable transversally to said path and towards said web portion to control the movement of said second predetermined area towards and at said second desired position.

7. The unit as claimed in claim 6, wherein said moving member is a rotatable member, which supports, in use, said web, and which is eccentrically rotatable about a fixed longitudinal axis transversal to said path, on the basis of said second position difference value, to push or release said web portion so as to position said second predetermined area at said second desired position.

8. The unit as claimed in claim 1, and comprising:

a first group comprising three of said first tools equidistant from each other along said advancing path with distances equal to the distance between said predetermined areas; and a second group comprising three of said second tools equidistant from each other along said advancing path with distances equal to the distance between said predetermined areas;

said buffer portion being arranged downstream of said second group and upstream of said first group along said advancing path.

9. A method for applying opening devices to a web of packaging material at a plurality predetermined areas of said web arranged at a non-zero distance from one another along said web; the method comprising the steps of:

a) feeding said web along an advancing path with a feeding tool, wherein the plurality of predetermined areas advances along such path as the web is fed;

b) applying a first opening device to a first predetermined area from among the plurality of predetermined areas at a first desired position by using at least one first tool as the first predetermined area advances through said first desired position;

c) applying a second opening device to a second predetermined area from among the plurality of predetermined areas at a second desired position by using at least one second tool as the second predetermined area advances through said second desired position; and d) accumulating along said path within a buffer portion, downstream of said second desired position and upstream of said first desired position, a web portion having a number of said plurality of predetermined areas which is a natural integer multiple of the number of tools used in the steps b) and c);

wherein the web portion accumulated within the buffer portion includes the first predetermined area that will receive the first opening device downstream of the buffer portion when the first predetermined area advances through the first desired position, and the second predetermined area that had received the second opening device upstream of the buffer portion when the second predetermined area had advanced through the second desired position, so that a relative distance between the first and second tools is reduced.

10. The method as claimed in claim 9, and further comprising the steps of:

e1) detecting, upstream of said first desired position, the position of said first predetermined area along said path;

e2) detecting, upstream of said second desired position, the position of said second predetermined area along said path;

g1) generating a first information correlated to the position detected at step e1);

g2) generating a second information correlated to the position detected at step e2);

h1) comparing said first information with a third information correlated to a pre-set nominal position of said first predetermined area along said path;

h2) comparing said second information with a fourth information correlated to a pre-set nominal position of said second predetermined area along said path;

i1) calculating a first position difference value based on the comparison made during the step h1);

i2) calculating a second position difference value based on the comparison made during the step h2);

l) advancing said first predetermined area towards and at said first desired position, on the basis of the first position difference value calculated at step i1);

m) positioning said second predetermined area at said second desired position, on the basis of the second position difference value calculated at step i2).

11. The method as claimed in claim 10, wherein said web portion comprises a first stretch adjacent to said first predetermined area and a second stretch adjacent to said second predetermined area;

and wherein the step m) of positioning comprises the steps of:

n) controlling a movement of the second stretch along said path;

o) leaving the first stretch substantially stationary along said path;

p) putting and maintaining under tension said web by pulling said web in a direction opposite to the advancing direction of the web along said advancing path.

12. The method as claimed in claim 10, and further comprising the step of:

q) positioning said first stretch at least during the step n) of controlling.

13. The method as claimed in claim 10, wherein the step m) of positioning comprises the step of:

r) controlling a moving member to move transversally to said path and to push or release, said web portion.

14. The method as claimed in claim 13, wherein the step r) of controlling comprises the step of:

s) supporting said web with a rotatable member; and t) rotating said rotatable member eccentrically with respect to a fixed longitudinal axis transversal to said path to move said web portion transversally to said path.

15. The method as claimed in claim 9, wherein the step b) of applying comprises the step of:

u) applying a plurality of first opening devices to a plurality of first predetermined areas by using a plurality of first tools;

and wherein the step c) of applying comprises:

v) applying a plurality of second opening devices to a plurality of second predetermined areas by using a plurality of second tools;

said plurality of first tools and said plurality of second tools having the same number of tools.

16. The method as claimed in claim 15, wherein the step u) of applying comprises the step of:

w) molding a plurality of first opening devices to a plurality of first predetermined areas by using a plurality of first molds;

and wherein the step v) of applying comprises the step of:

z) molding a plurality of second opening devices to a plurality of second predetermined areas by using a plurality of second molds.

17. A unit for applying opening devices to a web of packaging material at a plurality of predetermined areas of said web arranged at a non-zero distance from one another along said web;

said unit comprising:

a feeding group configured for feeding said web along an advancing path, wherein the plurality of predetermined areas advances along such path as the web is fed;

at least one first tool, arranged at a first desired position along said path and configured to apply a first opening device to a corresponding first predetermined area from among the plurality of predetermined areas as the first predetermined area advances through said first desired position; and at least one second tool, arranged at a second desired position along said path and configured to apply a second opening device to a corresponding second predetermined area from among the plurality of predetermined areas as the second predetermined area advances through said second desired position; and a buffer portion arranged along said path, downstream of said second tool and upstream of said first tool, and configured to accumulate a web portion having a number of said plurality of predetermined areas which is a natural integer multiple of the number of tools of said unit;

wherein the web portion accumulated within the buffer portion includes the first predetermined area that will receive the first opening device downstream of the buffer portion when the first predetermined area advances through the first desired position, and the second predetermined area that had received the second opening device upstream of the buffer portion when the second predetermined area had advanced through the second desired position, so that a relative distance between the first and second tools is reduced.

* * * * *